F. C. LEE.
Hub-Attaching Device.

No. 200,735. Patented Feb. 26, 1878.

WITNESSES:
C. Neveux
C. Sedgwick

INVENTOR:
F. C. Lee
BY Munn & Co
ATTORNEYS.

UNITED STATES PATENT OFFICE.

FREDERICK C. LEE, OF RIDGEFIELD, CONNECTICUT.

IMPROVEMENT IN HUB-ATTACHING DEVICES.

Specification forming part of Letters Patent No. 200,735, dated February 26, 1878; application filed February 4, 1878.

*To all whom it may concern:*

Figure 1:
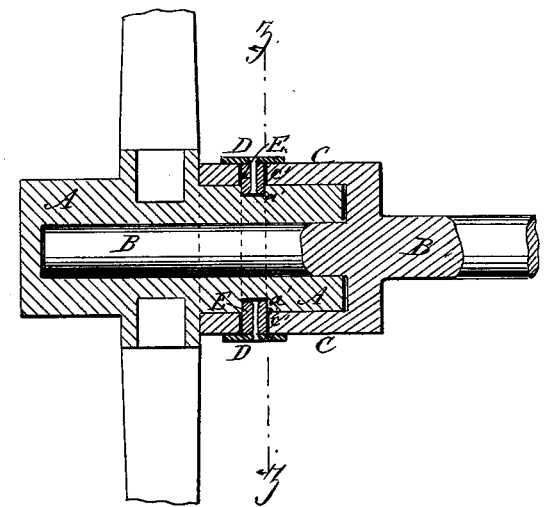
Figure 2:
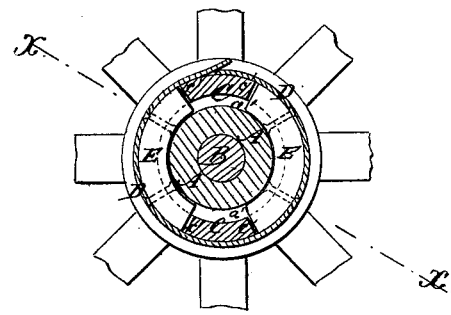

Be it known that I, FREDERICK C. LEE, of Ridgefield, in the county of Fairfield and State of Connecticut, have invented a new and useful Improvement in Securing Vehicle-Wheels to their Axles, of which the following is a specification:

Figure 1 is a longitudinal section of the hub and part of the axle of a vehicle to which my improvement has been applied, taken through the line $x\ x$ of Fig. 2. Fig. 2 is a cross-section of the same, taken through the line $z\ z$, Fig. 1.

Similar letters of reference indicate corresponding parts.

The object of this invention is to furnish an improved device for securing the wheels of vehicles to their axles, which shall be simple in construction and convenient and reliable in use, enabling the journal to be easily and quickly oiled, holding the wheel securely in place, keeping in the oil, and keeping out the dust.

The invention consists in the hub made with a closed outer end and a cylindrical inner end, having a ring-groove formed around it, the axle provided with a cup-collar having short transverse slots formed in its opposite sides, and the open spring-steel band provided with the blocks or keys, in combination with each other, as hereinafter fully described.

A represents the hub of a wheel which is made with a closed outer end and a cylindrical inner end. B is the axle, the journal of which enters the inner open end of the hub A. Upon the axle B is formed, or to it is attached, a cup-collar, C, the cavity of which receives and fits upon the inner end of the hub A. In the opposite sides of the cup-collar C are formed two short transverse slots, $c'$, which are directly opposite a ring-groove, $a'$, formed in the inner end of the hub A. D is an open band of spring-steel, which passes around the cup-collar C, covering the slots $c'$, and one end of which may be made fast to said cup-collar, if desired. To the band D are attached two catch blocks or keys, E, of such a size as to fit into the slots of the cup-collar C and of such a depth as to enter the ring-groove of the hub A, so as to fasten the said hub A securely upon the journal of the axle B, and at the same time allow the said hub to revolve freely upon its journal. The hub can be easily and quickly released, when required for oiling or other purposes, by springing the steel band D open so as to withdraw its blocks or keys E from the groove $a'$ of the hub and the slots $c'$ of the cup-collar.

Having thus fully described my invention, I claim as new and desire to secure by Letters Patent—

The hub A, made with a closed outer end and a cylindrical inner end, having a ring-groove $a'$ formed around it, the axle B, provided with a cup-collar, C, short transverse slots $c'$ formed in its opposite sides, and the open spring-steel band D, provided with the blocks or keys E, in combination with each other, substantially as herein shown and described.

FREDERICK C. LEE.

Witnesses:
JAMES T. GRAHAM,
C. SEDGWICK.